Jan. 1, 1963   C. E. DAVIS, JR   3,070,874
METHOD FOR ATTACHING A FITTING TO A PIPE
Filed July 23, 1959   2 Sheets-Sheet 1
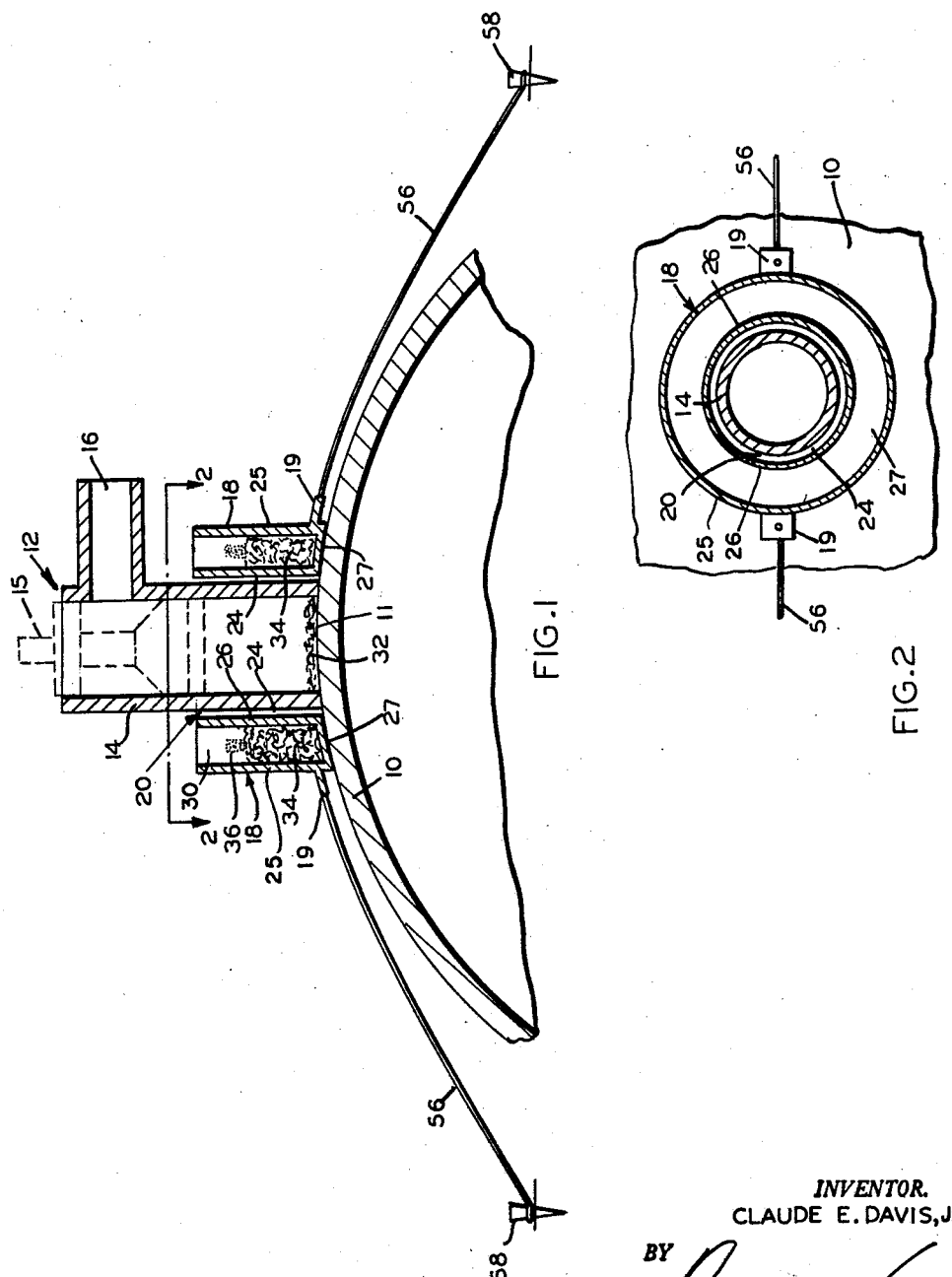
INVENTOR.
CLAUDE E. DAVIS, JR.
BY
ATTORNEY

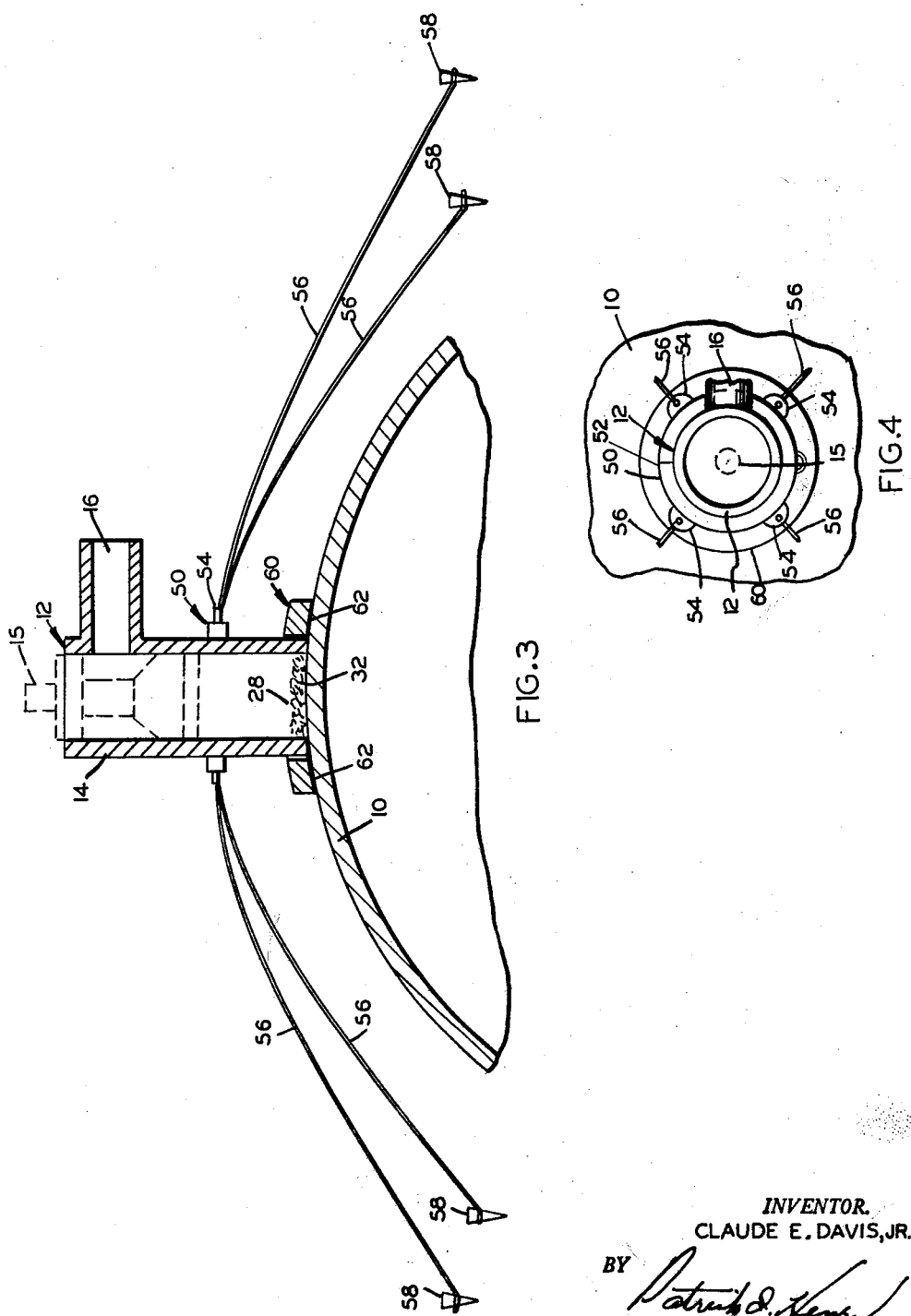

United States Patent Office 3,070,874
Patented Jan. 1, 1963

3,070,874
METHOD FOR ATTACHING A FITTING TO A PIPE
Claude E. Davis, Jr., Decatur, Ga.
(3125 Sussex Road, Augusta, Ga.)
Filed July 23, 1959, Ser. No. 829,037
7 Claims. (Cl. 29—157)

This invention relates to a method for attaching a fitting to a pipe, especially to the addition of a curb T pipe fitting to another pipe as is often necessary in adding branch lines to water pipe, gas pipe and the like that are already in place.

The method and apparatus which is disclosed herein has been developed to attach curb T-valves to the gas main for household service connection in order to effect a considerable savings in time and expense over existing methods.

According to the present method, the cost of installation is reduced and the method can be practiced and employed safely by semi-skilled or practically unskilled labor who could perform this operation without the use of certain noticeably expensive equipment now being used. It is often necessary to add branch service pipes from large main supply pipes as in the case of adding branch pipe service from a main gas line to various individual houses along the street. In compliance with the various local building and safety codes, it is usually necessary to add or employ a T valve or T fitting at the main gas line from which the branch service connection is run. According to one existing method, this involves a certain procedure for safely clearing the main gas line in order to tap and drill a hole therein into which a T valve is screwed to form a gas pipe fitting. Since this work is being performed on relatively hard durable steel pipe, it requires elaborate expensive equipment for aligning and properly drilling and tapping holes therein. On the other hand, the use of conventional welding equipment, such as oxyacetylene equipment, arc welding equipment, and such methods as brazing, etc., involves considerable difficulty in view of the explosive nature of the gas in the main supply pipe and in addition these methods require experienced personnel working under somewhat difficult conditions which cause quite an expense.

The present method is a procedure utilizing exothermic welding materials in order to provide an exothermic weld of the T in place on the gas main by following a series of steps taught by my method.

Generally described, without the use of patent claim parlance and therefore with no implication whatsoever of restriction on the scope of this invention, my method involves the placing of the usual T-valve in place on the main gas pipe, maintaining it in position thereon by means of a suitable clamping mold or other positioning means, removal of the portion of the inside of the valve itself to expose the top of the main gas pipe inside the confines of the T-valve, then placing flux on the main gas pipe by pouring same through the valve and dropping it to the bottom, after having thoroughly cleaned the small surface of the main pipe involved. Next the premixed connective compound is dropped through the opening in the T-valve and rests on the main supply pipe. The connective compound consists of several deoxidizers with a base of homogenized triple fluoride mixed with silver, copper, zinc, nickel and negligible amounts of residuals. The amount of connective compound used is determined by the diameter and thickness of the T-valves. Exothermic materials, consisting of aluminum oxide, iron oxide and modifications thereof, are used externally to attain necessary temperatures, to supply the necessary heat to complete the joining operation. Again, the amount of exothermic material used is predetermined by the thickness and diameter of the T valves.

The exothermic material held loosely in a shell mold would surround the T-valve and is ignited by the use of magnesium powder—the modified method uses a solid exothermic ring, surrounding the T-valve, and is impregnated with magnesium powder which starts the chemical reaction of the exothermic material, supplying heat to the parts to be joined. The premixed connective compound cleanses, melts and flows around and between the parts to be joined. The exothermic residual material can be removed by a blow with a hammer or allowed to remain on the joint. A hole is then drilled through the valve opening through the main body of the pipe and the inner portion of the valve is replaced completing the operation.

A primary object of my invention is to provide a simple expedient "on-the-job" method of welding a T-valve fitting or the like to a main pipe line.

An additional object of my invention is found in the particular exothermic method employed whereby the exothermic material is placed outside the valve and inside a shield while certain other materials are placed inside the valve whereby ignition of the exothermic material will cause a clean welding action.

A further object of my invention resides in the arrangement whereby my method may be practiced without the use of special equipment such as arc welders and other special type machinery.

Other and further objects of my invention will become apparent upon reading the following specification taken in conjunction with the accompanying diagrammatic drawings wherein:

FIG. 1 is a diagrammatic vertical cross-sectional view of a typical metal gas pipe having a curb-T placed thereon with a shell mold in place for the practice of my method.

FIG. 2 is a cross-sectional view taken along the line 2—2 in FIG. 1.

FIG. 3 is a diagrammatic, vertical cross-sectional view of a modified form of the method and apparatus in FIG. 1 illustrating the practice of this method without the shell mold.

FIG. 4 is a top view of the arrangement shown in FIG. 3.

Referring initially to FIG. 1, a gas or similar main pipe 10 cylindrical in shape and constructed from a hard metal material such as steel or the like has positioned thereon a typical curb-T fitting 12 with a main cylindrical body portion 14 and protruding connection portion 16 formed integrally therewith at an angle of 90° from the center line of said main body portion 14. Main body 14 is adapted to receive conventional valve means 15 (dotted lines) which has been and would be removed as one of the initial steps in practicing my method, and which would be replaced upon the completion of the permanent fitting of the T-valve in place. The T fitting 12 is manually placed at the proper spot on the pipe 10 with the bottom bore thereof at the place where communication will be established with the interior of the pipe 10. After positioning the open T valve 12 in place on the proper spot 11 of the main gas line 10 a shell mold 18 is clamped from lugs 19 thereon by straps pegged into the ground, or otherwise fastened in place around the T fitting 12. Initially the spot 11 on the main pipe 10, which is covered by the abutment of the valve thereat, has been thoroughly cleaned as by wire brushing or sanding all corrosion, rust, paint, therefrom down to clean, bare metal. Shell mold 18 is "V-shaped" in cross-section with an internal hole 20 generally fitted to and similar size of the over-all external configuration and shape of the T-valve 12 but the hole 20 is a slight amount larger than the overall dimensions of the T-valve 12, thereby leaving a space 24 between the mold 18 and the external surface of the T fitting 12. The mold 18 is shaped somewhat like an angel food cake pan with concentric walls 25, 26 and bottom 27 defining a cavity 30. With the T 12 firmly positioned in the proper spot 11 on the main gas line and with the shell mold 18 clamped in place thereon, the joining operation proceeds as follows.

A suitable flux material 28 which may be procured from any number of suppliers, such as All-State Welding Alloys Co., Inc., White Plains, N.Y.; United Wire and Supply Corporation, Providence 7, Rhode Island; or Eutectic Welding Alloys Corp., 40—40 172nd St., Flushing, N.Y., is poured in the valve opening in the main body 14 thereof dropping down onto the cleaned surface 11 and resting thereon in a pile and in a quantity previously determined as adequate. A connective compound 32, such as effected by brazing, welding or soldering, and having a base of homogenized triple fluoride mixed with silver, copper, zinc, nickel and negligible amounts of residuals, is placed on the main pipe 10 with the flux. A suitable connective compound may be readily selected from any one of the above named suppliers and can be matched with the flux. The connective compound 32 is added in exactly the same manner, that is, by pouring or dropping same through the body of the main T-valve body 14 down onto the surface of the pipe 10 and onto the flux material.

Then a suitable exothermic material 34 consisting of aluminum oxide, iron oxide and modifications thereof, is placed around the outside of the curb-T valve inside of the cavity of the shell mold 18 so as to form a deposit or accumulation around the periphery and edge of the T-valve at the junction of the bottom of the T-valve and the pipe 10. It has been found that a suitable exothermic material 34 may be procured from Exomet Inc., Conneaut, Ohio, or Thermex Metallurgical, a corporation of Lakehurst, New Jersey. The flux, the connective material 32, and the exothermic material 34 may be selected and matched according to the connective metal used, the metal on fitting body 14 and pipe 10, and the characteristics desired, and there are various materials known in this exothermic art which may be used for this purpose.

An ignitable material such as magnesium powder 36 in a small quantity is placed then on the exothermic material inside the cavity of the mold 18 and with the exothermic material thereat. The magnesium powder is then ignited by any suitable flame or method and at this time the exothermic material 34 reacts to the heat to furnish the extreme heat necessary to melt flux and the welding compound. At this time the flux cleans the parts to be joined and the welding compound melts and by capillary action or attraction flows around and between the parts to be joined. After the joined (welded, brazed, etc.) connection has been allowed to cool, the mold and the residue of exothermic material are removed from all places. Mold 18 may be removed simply by slipping it from the top of the fitting 12 tilting the mold slightly so that it will clear the top of the fitting and also can be slipped from the portion 16. For purpose of illustration, the size in relationship of the mold 18 with respect to the fitting 12 and the portion 16 may be shown larger than in actual practice. In addition, the conventional arrangement of the T-fitting 12 is such that the fitting may be disassembled to the extent that the internal mechanism may be removed and the portion 16 may be removed if it becomes necessary to do this in order to remove the mold 18. A hole is drilled inside the T-valve 12 through the pipe 10. Then the joint having been completed through the gas main through the surface of the pipe 10 inside the T-valve 12 thereby establishing communication from the main pipe 10 through the T-valve 12 itself, immediately thereafter the internal portion of the T-valve 12 is replaced in the valve and the method is complete. The exothermic material 34 may be ignited by direct flame without magnesium, or by any other suitable method.

In the modification shown in FIGS. 3 and 4, the shell mold 18 has been eliminated for convenience, economy or simplicity and the T fitting 12 is positioned on and held in place on the main pipe 10 by means of a clamp collar device 50 having a split-ring body portion split at 52 and also having formed integral therewith lugs 54. There are four such lugs 54 in this embodiment spaced about the periphery of the collar 50. The collar device 50 is fitted tightly onto the body of the T fitting 12 (for later removal) and straps 56 are fastened to a respective lug 54 and then stretched outwardly in spaced relation to a respective spot where they are firmly pegged into the ground by pegs 58 or otherwise fixed in place. An exothermic ring 60 is positioned at the bottom of the fitting 12 and resting on top of the pipe 10. The exothermic ring 60 is a solid "cake-like" ring of exothermic material of "washer-like" formation with a flat bottom 62 that will rest on the top of the pipe 10. In the practice of this method, the flux 28 and connective compound 32 are dropped into the center of the open pipe fitting 12 down onto the top of the pipe 10. Then the exothermic ring 60 is ignited by any suitable method (ignition material, torch, etc.). When the exothermic material 60 has reached the proper burn point it will cause the connective material 32 to join the T fitting 12 to the pipe 10. After that, a hole is made between the fitting 12 bore and the main pipe 10 interior.

While I have shown and described my method and apparatus in particular detail and in two embodiments thereof, this is in no way to be construed as any sort of limitation thereon since various alterations, changes, modifications, substitutions, eliminations and variations therefrom may be made without departing from the scope of my invention defined in the appended claims.

I claim:

1. A method of connecting a pipe fitting or the like to a main pipe comprising: selecting a spot on the main pipe to receive the fitting thereat, positioning the bottom of said fitting at the prepared spot, and firmly securing said fitting in place thereon, fluxing the surface of the pipe with a suitable flux material, placing a connective compound through said fitting onto the spot where said flux material has been placed, then providing an exothermic material on the outside of said valve fitting, igniting said exothermic material to cause said exothermic material to burn with sufficient heat to melt said connective compound to cause said connective compound to flow into the joint where the fitting is attached, and finally drilling a hole through said prepared spot thereby establishing permanent communication between said main line and said fitting.

2. The method of claim 1 wherein said exothermic material is a solid ring outside said fitting.

3. A method of connecting a pipe fitting or the like to a main pipe comprising: selecting and preparing a spot on the main pipe to receive the fitting thereat, positioning the bottom of said fitting at the prepared spot, and firmly securing said fitting in place thereon, placing a flux material on the prepared spot of said main pipe by dropping same through said fitting, placing a welding compound through said fitting onto the spot where said flux material has been placed, then providing an exothermic material on the outside of said valve fitting, igniting said exothermic material to cause said exothermic material to burn with sufficient heat to melt said welding compound to cause same to flow into the joint where said fitting attaches to said pipe, and finally drilling a hole through said prepared spot thereby establishing permanent communication between said main line and said fitting.

4. The method of claim 3 wherein said exothermic material is a solid exothermic ring placed outside of said fitting.

5. A method of connecting a pipe fitting or the like to a main pipe comprising: preparing a spot on said pipe, positioning the bottom of said fitting at a spot on said pipe and firmly securing said fitting in place thereon, placing a flux material on the prepared spot of said main pipe by dropping same through said fitting, placing a heat connective compound through said fitting onto the spot where said flux material has been placed, then providing an exothermic material on the outside of said valve fitting, igniting said exothermic material to cause said exothermic material to burn with sufficient heat to melt said connective compound to cause said connective compound to flow into the joint where said fitting attaches to said main pipe, and finally drilling a hole through said prepared spot thereby establishing permanent communication between said main line and said fitting.

6. A method of connecting a pipe fitting or the like to a main pipe comprising: preparing a spot on the main pipe to receive the fitting thereat, positioning the bottom of said fitting at the prepared spot, and firmly clamping said fitting in place thereon, placing a retaining means around said fitting to combine part of said fitting and to form a cavity space between said fitting and the inside of said retaining means, placing a flux material on the prepared spot of said main pipe by dropping same through said fitting, placing a heat connective compound through said fitting onto the spot where said flux material has been placed, then providing an exothermic material on said valve fitting inside the space of said retaining means igniting said exothermic material to cause said exothermic material to burn with sufficient heat to cause said heat connective compound to melt to cause said heat connective compound to flow into the joint where said pipe fitting attaches to said main pipe, and finally drilling a hole through said prepared spot thereby establishing permanent communication between said main line and said fitting.

7. A method of connecting a pipe fitting or the like to a main pipe comprising: positioning the bottom of aid fitting at a spot on said pipe and firmly securing said fitting in place thereon, placing a cavity mold around said fitting to form a cavity space outside said fitting, placing a flux material on the prepared spot of said main pipe by dropping same through said fitting, placing a welding compound through said fitting onto the spot where said flux material has been placed, then providing an exothermic material on the outside of said valve fitting inside the cavity of said mold, igniting said exothermic material to cause said exothermic material to burn with sufficient heat to melt said welding compound to cause said welding compound to flow into the joint where said pipe fitting attaches to said main pipe, and finally after said connection is complete, drilling a hole through said prepared spot thereby establishing permanent communication between said main line and said fitting.

References Cited in the file of this patent

UNITED STATES PATENTS

| | | |
|---|---|---|
| 1,146,664 | Stockstrom | July 13, 1915 |
| 1,915,847 | Brant | June 27, 1933 |
| 2,528,280 | Lyon | Oct. 31, 1950 |
| 2,667,865 | Herman | Feb. 2, 1954 |
| 2,745,368 | Klein | May 15, 1956 |
| 2,756,486 | Smith | July 31, 1956 |

FOREIGN PATENTS

| | | |
|---|---|---|
| 832,632 | France | July 4, 1938 |